US006778289B1

(12) United States Patent
Iwata

(10) Patent No.: US 6,778,289 B1
(45) Date of Patent: Aug. 17, 2004

(54) IMAGE PROCESSING DEVICE

(75) Inventor: Nobuo Iwata, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/577,829

(22) Filed: May 25, 2000

(30) Foreign Application Priority Data

Jun. 18, 1999  (JP) ............................................ 11-172138

(51) Int. Cl.$^7$ .......................... G06F 15/00; G06F 13/00
(52) U.S. Cl. ...................... 358/1.15; 358/1.1; 709/217; 709/218; 709/219; 709/245; 709/380; 709/51; 709/52
(58) Field of Search ................................ 358/1.15, 1.1; 709/245, 217, 218, 219; 380/51, 52

(56) References Cited

U.S. PATENT DOCUMENTS

| | | | | |
|---|---|---|---|---|
| 6,091,518 | A | * | 7/2000 | Anabuki ...................... 358/500 |
| 6,233,684 | B1 | * | 5/2001 | Stefik et al. ................. 713/176 |
| 6,351,317 | B1 | * | 2/2002 | Sasaki et al. ............... 358/1.15 |
| 6,515,765 | B1 | * | 2/2003 | Umebayashi ................ 358/1.9 |
| 6,567,180 | B1 | * | 5/2003 | Kageyama et al. ......... 358/1.15 |
| 2001/0012119 | A1 | * | 8/2001 | Umebayashi .............. 358/1.15 |

FOREIGN PATENT DOCUMENTS

| | | |
|---|---|---|
| JP | A-5-191402 | 7/1993 |
| JP | A-6-77994 | 3/1994 |
| JP | A-10-307792 | 11/1998 |

OTHER PUBLICATIONS

Information Technology—Document Printing Application (DPA), ISO 10175-1, pp. 50–53 and 246–247, Jul. 1994.

Internet Printing Protocol/1.0Model and Semantics,RFC 2566, pp. 41, Apr. 1999.

* cited by examiner

Primary Examiner—Edward Coles
Assistant Examiner—Alan Rahimi
(74) Attorney, Agent, or Firm—Oliff & Berridge, PLC

(57) ABSTRACT

When a user wishes to print a document available in a server (E103), the user transmits a document information transmission request (X200) from a computer (E102) to a specified printer (E101) The printer (E101) transfers this request (X200) to the server (E103), and the server (E103) sends document information (X201) including a list of URLs of documents available in itself to the computer (E102) via the printer (E101) When the user specifies the desired document shown in the document information (X201) on the computer (E102), the computer (E102) sends a print URL request (X202) to the printer (E101) requesting a printout of the document specified by its URL. The printer (E101) acquires document data of the specified URL from the server (E103) and prints the pertinent document.

14 Claims, 10 Drawing Sheets

```
GET http://printer01.office.fx.co.jp/list_docs/ABCseminar.co.jp/ HTTP/1.0 $C_R L_F$
$C_R L_F$
$C_R L_F$
```

```
GET http://ABCseminar.co.jp/documents.html HTTP/1.0 CRLF
CRLF
CRLF
```

FIG. 12

```
HTTP1.0 200 OK C_R L_F
Content-Type: text/html C_R L_F
C_R L_F
<HTML>
<HEAD><TITLE>Document List</TITLE></HEAD>
<BODY>
<TABLE BORDER>
<TR><TH>#</TH><TH>Title</TH><TH>New</TH><TH>Update</TH></TR>
<TR><TD>1</TD><TD ALIGN="left">ABC seminar 99 autumn report</TD><TD>!</TD><TD>981101</TD>
<TD>http://ABCseminar.co.jp/99a_rep.prn</TD></TR>
<TR><TD>2</TD><TD ALIGN="left">ABC seminar 99 autmun preview</TD><TD> </TD><TD>981101</TD>
<TD>http://ABCseminar.co.jp/99a_prev.prn</TD></TR>
<TR><TD>3</TD><TD ALIGN="left">ABC seminar 99 autumn announcement</TD><TD> </TD><TD>981101</TD>
<TD>http://ABCseminar.co.jp/99a_ann.prn</TD=</TD></TR>
</TABLE>
</BODY>
<HTML>
C_R L_F
```

FIG. 13

```
HTTP1.0 200 OK CR LF
Content-Type: text/html CR LF
CR LF
<HTML>
<HEAD><TITLE>Document List</TITLE></HEAD>
<BODY>
<FORM ACTION="http://printer01.office.fx.co.jp/print_url" method="POST" enctype"multipart/form">
<TABLE BORDER>
<TR><TH><#</TH><TH>Title</TH><TH>New</TH><TH>Update</TH></TR>
<TR><TD>1</TD><TD ALIGN="left">ABC seminar 99 autumn report</TD><TD>!</TD><TD>981101</TD>
<INPUT TYPE="checkbox" NAME="print-doc-01" VALUE="http://ABCseminar.co.jp/99a_rep.prn"></TR>
<TR><TD>2</TD><TD ALIGN="left">ABC seminar 99 autmun preview</TD><TD><TD>981101</TD>
<TD>INPUT TYPE="checkbox" NAME="print-doc-02" VALUE="http://ABCseminar.co.jp/99a_prev.prn"></TD>
</TR>
<TR><TD>3</TD><TD ALIGN="left">ABC seminar 99 autumn announcement</TD><TD><TD><TD>981101</TD>
<TD>INPUT TYPE="checkbox" NAME="print-doc-03" VALUE="http://ABCseminar.co.jp/99a_ann.prn"></TD>
</TR>
</TABLE>
<INPUT TYPE="radio" name="duplex" value="duplex">
<SELECT NAME="n-up"><option VALUE="1">1<option VALUE="2"></SELECT>
<INPUT type="text" name="copies" size="2">
<BR>
<INPUT TYPE="submit">>
</FORM>
</BODY>
</HTML>
CR LF
```

FIG. 15

```
POST http://printer01.office.fx.co.jp/print_url HTTP/1.0 $C_R L_F$
$C_R L_F$
_____ $C_R L_F$
NAME="print-doc-01" $C_R L_F$
VALUE="http://ABCseminar.co.jp/99a_rep.prn" $C_R L_F$
_____ $C_R L_F$
$C_R L_F$
```

FIG. 16

```
GET http://ABCseminar.co.jp/99a_rep.prn HTTP/1.0 $C_R L_F$
$C_R L_F$
$C_R L_F$
```

FIG. 17

```
HTTP1.0 200 OK $C_R L_F$
Content-Type:application/x-fx-pdl $C_R L_F$
$C_R L_F$

"99 AUTUMN REPORT DOCUMENT DATA IS STORED HERE."

$C_R L_F$
```

IMAGE PROCESSING DEVICE

BACKGROUND OF THE INVENTION

1. Field of the Invention

The present invention relates to an image processing device such as a printer which prints document data acquired from a server by entering reference information corresponding to the document data to be printed through an external device.

2. Description of the Prior Art

With the proliferation of the Internet, it has become possible to download document data from a server connected to the Internet, read the document data through the Internet using a browser on a computer, and thereby perform electronic publishing (FIG. 1). Since the document data is once stored in the computer in such a system, the data could potentially be reused electronically. More specifically, the document data might be printed more than once or edited by using editing software by an unknown user. It is therefore difficult to electronically publish valuable document data through the Internet in this kind of system.

There is known another conventional system (FIG. 2) in which a computer transmits a print request X202 including reference information, such as a Uniform Resource Locator (URL), of specific document data to a printer and the printer acquires and prints the document data according to the reference information X203, as disclosed in Japanese Unexamined Patent Laid-Open No.6-77994. Furthermore, it is possible to prevent the document data from being acquired by other than the printer of the system of FIG. 2 if a server authenticates each printer by using a technique disclosed in Japanese Patent Laid-Open No. 5-191402, for example. In other words, it is possible to prevent the computer from pretending to be the printer of the aforementioned system and thereby acquiring the document data. Therefore, it is possible to prevent the document data from being reused according to the system of the Japanese Patent laid-Open No. 6-77994, because the document data is not stored in a user-accessible internal storage medium of the computer, for example.

The latter system is particularly effective for a system in which a computer or a printer is notified of reference information of specific document data, like "What's New" documents, by a server as disclosed in Japanese Unexamined Patent laid-Open No. 10-307792.

In the aforementioned system, however, it is necessary that the reference information of document data transmitted to the printer indicate specific document data. Accordingly, there arises a problem that it is impossible to specify the document data to be printed by the printer if the reference information of the document data is unknown. In other words, the computer must acquire the reference information of a document to be printed and notify the printer of the acquired reference information to cause the printer to print the document. However, document search and print request can not be done by a single operation but done by using search software and print request software which are usually separate programs, so that a user must perform rather complex operations. If it is desired to avoid this complexity, it would be necessary for the user to have a special software program which makes it possible to execute document search and print request instructions by a single operation.

Since the aforementioned server permits access from the computer as it searches through attribute information, complicated computer access control is required. Furthermore, the server's function of permitting access from the computer in performing the search operation might be abused, and this causes an increased risk of information leakage from inside the server.

SUMMARY OF THE INVENTION

The present invention has been made in view of the above circumstances and provides a system in which a user can enter reference information of a desired document from a computer to a printer, and the printer reads data of the document from a server according to the reference information and performs a predetermined operation, such as data storage or printing, wherein the user is allowed to easily find the reference information (e.g., URL) of the desired document even when the user does not have a special software program. Also, the invention enables a computer of an unspecified user to acquire the reference information of a desired document without allowing access to the server from the computer of the unspecified user.

According to the present invention, an image processing device receives reference information of a desired document from an external device, acquires the document from a server using the reference information and performs a predetermined operation, such as data storage or printing. The image processing device includes a receiving section for receiving a reference information request from the external device, a reference information acquisition section for acquiring the reference information from the server according to the reference information request, and a reference information transmission section for transmitting the reference information acquired by the reference information acquisition section to the external device. With this configuration, the external device can acquire reference information of documents available in the server via a printer. Here, the reference information refers to such information as URL indicating the location (e.g., the site on a network) of the individual documents.

In one aspect of the invention, the image processing device further includes a server designation section for determining the server from which the reference information is to be acquired based on the reference information request received by the receiving section. The reference information acquisition section acquires the reference information according to the reference information request from the server determined by the server designation section. In this configuration, the external device can acquire the reference information from a desired server via the printer.

In another aspect of the invention, the image processing device further includes a server designation information input section which allows entry of information to be used for determining the server based on the reference information request, and a server designation information memory for storing the information entered from the server designation information input section. In this configuration, the server designation section determines the server from which the reference information is to be acquired the reference information request received by the image processing device and the information stored in the server designation information memory.

In still another aspect of the invention, the image processing device further includes a request converter for converting the reference information request received by the receiving section into a predetermined format which can be recognized by the server. The reference information acquisition section sends the reference information request converted by the request converter to the server. In this configuration, the reference information request the image processing device has received from the external device is edited by the image processing device and transmitted to the server and, as a consequence, the server sends back the reference information according to the request.

In yet another aspect of the invention, the image processing device further includes a reference information converter for converting the reference information acquired by the reference information acquisition section into a format which can be displayed by the external device. The reference information transmission section transmits information converted from the reference information by the reference information converter. In this configuration, even when the reference information transmitted from the server is of a format which can not be displayed by the external device, the image processing device can convert it into the format suited for display on the external device.

Preferably, the reference information converter converts the reference information from the server into the information of such format that makes it possible to accept an input by an operator specifying a desired item in the reference information at the external device and transfer the operator input to the image processing device. An example of such format is Common Gateway Interface (CGI) in HyperText Makeup Language (HTML). This makes it possible for the operator to transmit a print request for a document included in the reference information to the image processing device by using commonly available software like a Web browser on the external device.

Alternatively, the reference information converter converts the reference information acquired from the server into such format that enables an operator to enter additional information concerning a printing method of the desired document at the external device. This makes it possible for the operator to transmit a print request for the document included in the reference information to the image processing device by using commonly available software like a Web browser and enter additional instructions concerning the method of printing the document, such as double-sided printing, the number of printouts and stapler treatment, from the external device.

In yet another aspect of the invention, the image processing device further includes an authentication section which enables the server to perform a predetermined authentication operation. With this configuration, it becomes possible to directly access the server or to deny access from an unauthorized image processing device.

The invention also provides a printing system in which reference information indicating the location of a document requested by an operator is sent from a computer manipulated by the operator to a printer, and the printer which has received the reference information acquires the document corresponding to the reference information from a server according to the reference information. The printer includes a reference information acquisition section for acquiring a list of reference information of documents available in the server according to a request from the computer, and a reference information transmission section for transmitting the acquired list of the reference information to the computer. The server sends back the list of the reference information of the documents to the printer in response to a request from the printer.

According to this printing system, the operator can locate the desired document and print it by just accessing the printer.

In another aspect of the invention, the server further includes a section for determining whether the request for the list of the reference information was issued by a previously registered printer when the request has been received, wherein the server accepts the request only from the previously registered printer. This configuration serves to increase the security of the server.

The invention further provides a method of printing a desired document available in a server by using a printer selected by a user according to a command from a computer which is manipulated by the user. The method includes the steps of (a) causing the computer to send a list acquisition request to the user-selected printer requesting it to acquire a list of reference information of documents available in the server, (b) causing the printer to send a list transmission request to the server requesting it to send back the list of the reference information of the documents in accordance with the list acquisition request, (c) causing the server to send back the list of the reference information of the documents available in the server to the printer in accordance with the list transmission request, (d) causing the printer to send data on the list of the reference information received from the server to the computer, (e) causing the computer to present a selection entry display based on the data on the list of the reference information received from the printer, enabling the user to specify the desired document, (f) causing the computer to send a print request to the printer, the print request including the reference information of the document specified by the user on the selection entry display, and (g) causing the printer to acquire data on the user-specified document from the server based on the reference information included in the print request and print out the document.

BRIEF DESCRIPTION OF THE DRAWINGS

A preferred embodiment of the invention will be described, by way of example, referring to the following drawings, in which:

FIG. 12 shows an example of an electronic message indicating document information the printer of the embodiment receives from the server;

FIG. 13 shows an example of an electronic message indicating document information the printer of the embodiment transmits to the computer;

FIG. 15 shows an example of an electronic message indicating a print URL request the printer of the embodiment receives;

FIG. 16 shows an example of an electronic message indicating a document acquisition request the printer of the embodiment transmits; and FIG. 17 shows an example of an electronic message indicating the document data the printer of the embodiment receives from the server.

DESCRIPTION OF THE PREFERRED EMBODIMENTS

Now, a preferred embodiment of the invention is described in detail in conjunction with the accompanying drawings.

Figure 1:
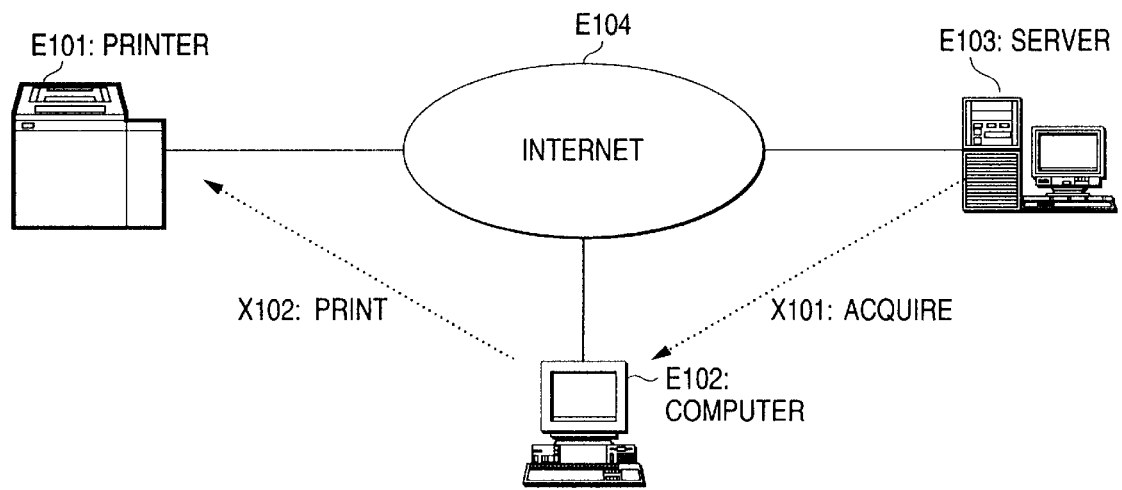
FIG. 1 is a system configuration diagram of a system in which a printer of the prior art works.
Figure 2:
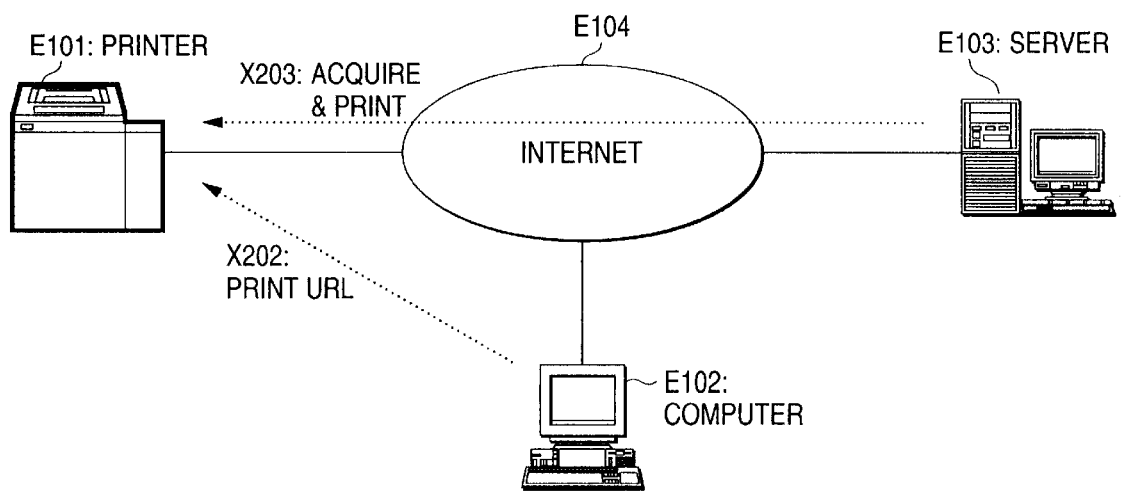
FIG. 2 is a system configuration diagram of a system in which another printer of the prior art works.
Figure 3:
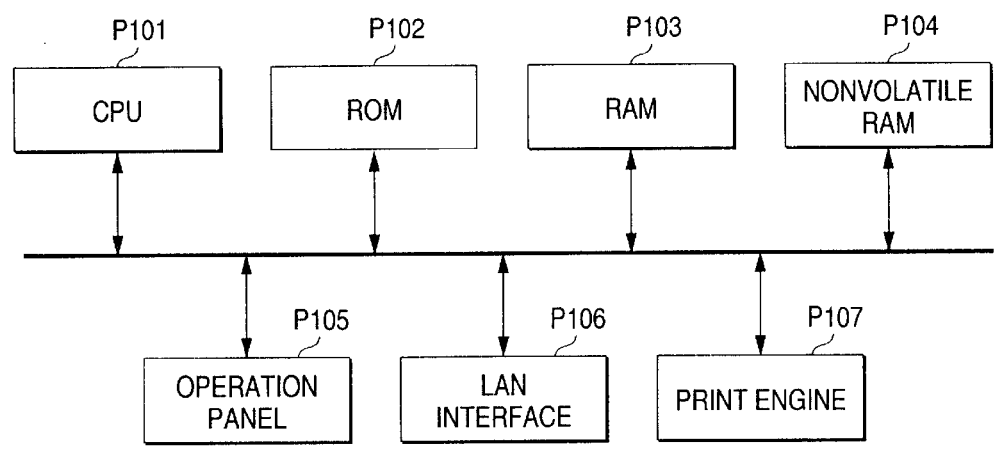
FIG. 3 is a hardware configuration diagram of a printer according to the embodiment of the invention.

FIG. 3 is a hardware configuration diagram of a printer according to the embodiment of the invention, in which a central processing unit (CPU) P101 executes software stored in a read-only memory (ROM) P102. A random-access memory (RAM) P103 temporarily stores data to be processed or to be used for processing during execution of the software. An operation panel P105 displays system status and allows an operator to enter settings under the control of the software. A nonvolatile RAM P104 stores, for example, set information entered from the operation panel P105. A local-area network (LAN) interface P106 transmits and receives data over the LAN under the control of the software. A print engine P107 prints image data generated in the RAM P103 and transmitted from the RAM P103 on a specified sheet of paper under the control of the software.

Figure 4:
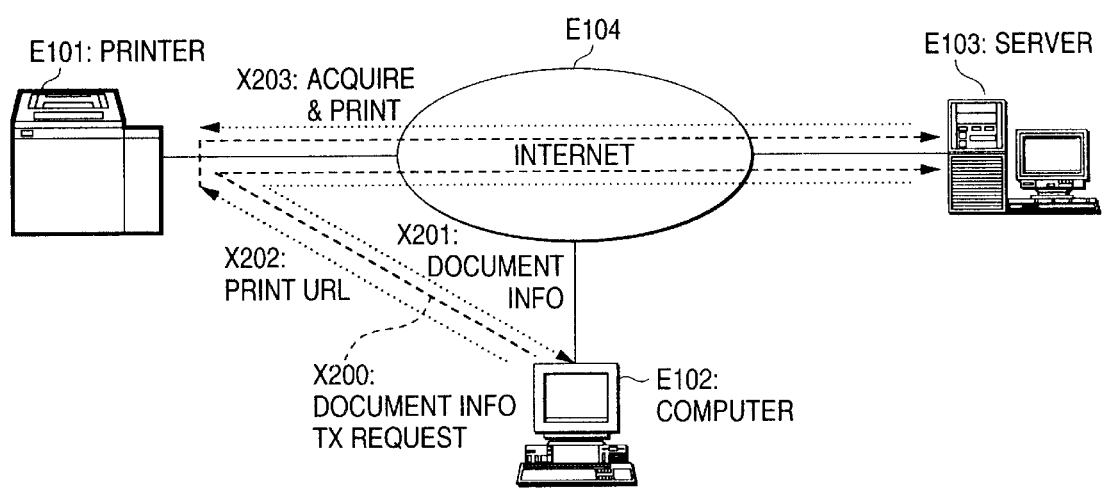
FIG. 4 is a system configuration diagram of a system in which the printer of the embodiment works.

FIG. 4 is a system configuration diagram illustrating the operation of the printer of the embodiment. First, when a user wants a printout of a document located in a server E103 but does not know reference information (e,g., URL) of the document, the user transmits a document information transmission request X200 from a computer E102 to a predetermined printer E101. The printer E101 transfers the document information transmission request X200 to the server E103. Here, the document information transmission request X200 is request data which requests a list of reference information of documents available in the desired server E103. Upon receiving this request X200, the server E103 sends back document information X201 including the reference information of the individual documents managed by the server E103 itself to the printer E101. The printer E101 then transmits this document information X201 to the computer E102 from which the document information transmission request X200 was issued.

Upon receiving the document information X201, the computer E102 selects the desired document from the multiple documents listed in the document information X201 and issues a print request X202 requesting a printout of the desired document by transmitting its reference information to the printer E101 of the embodiment. Subsequently, the printer E101 reads relevant document data from the server E103 based on the received reference information and prints the document data.

As will be recognized from the above discussion, this embodiment helps alleviate operational complexity since the user is only required to access the printer E101 when it is desired to print a document of which the user does not know precise reference information. More specifically, when the user wishes to print a document whose precise reference information is unknown, it has conventionally been necessary to query a server in which the document is stored, find out its reference information, and transmits a print request including the reference information of the document to a printer. According to this embodiment, however, the user can issue a print request for a document even if its precise reference information is unknown by just accessing a Web page at the printer and performing operations according to a guide provided by the Web page. In this embodiment, the user need not have any special software in his or her computer except for a commonly available Web browser (or generally known communications software similar to the Web browser).

Also, in this embodiment, the computer E102 does not transmit a request for information about the documents available in the server E103 directly to the server E103 but through the printer E101. Here, the relevant printer E101 is one of printers which were registered beforehand as devices authorized to access the server E103. The server E103 has the capability to determine whether any printer which has accessed the server E103 is an authorized one having proper access rights by using an authentication system, such as a public-key encryption system. The server E103 does not accept a document information request from other than the aforementioned authorized printer (E101) For example, the server E103 does not accept a document information request from a general user's computer or from an unregistered printer (which can not be authenticated). Accordingly, the user can obtain the reference information of the documents and their contents held in the server E103 only through the properly registered printer E101 in this embodiment, and this would ensure the security of the server E103.

Figure 5:
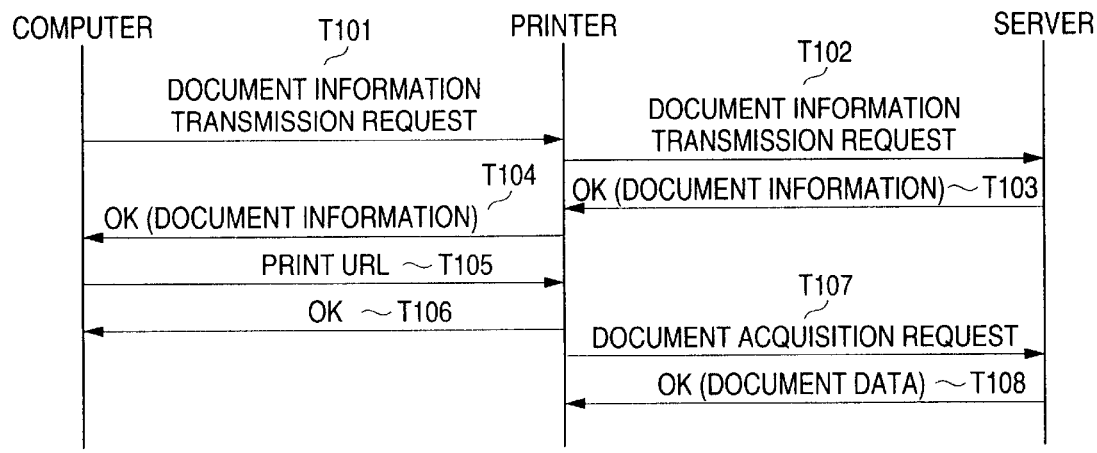
FIG. 5 is a sequence diagram showing flows of electronic messages exchanged between the printer of the embodiment and a computer and a server.
Figure 6:
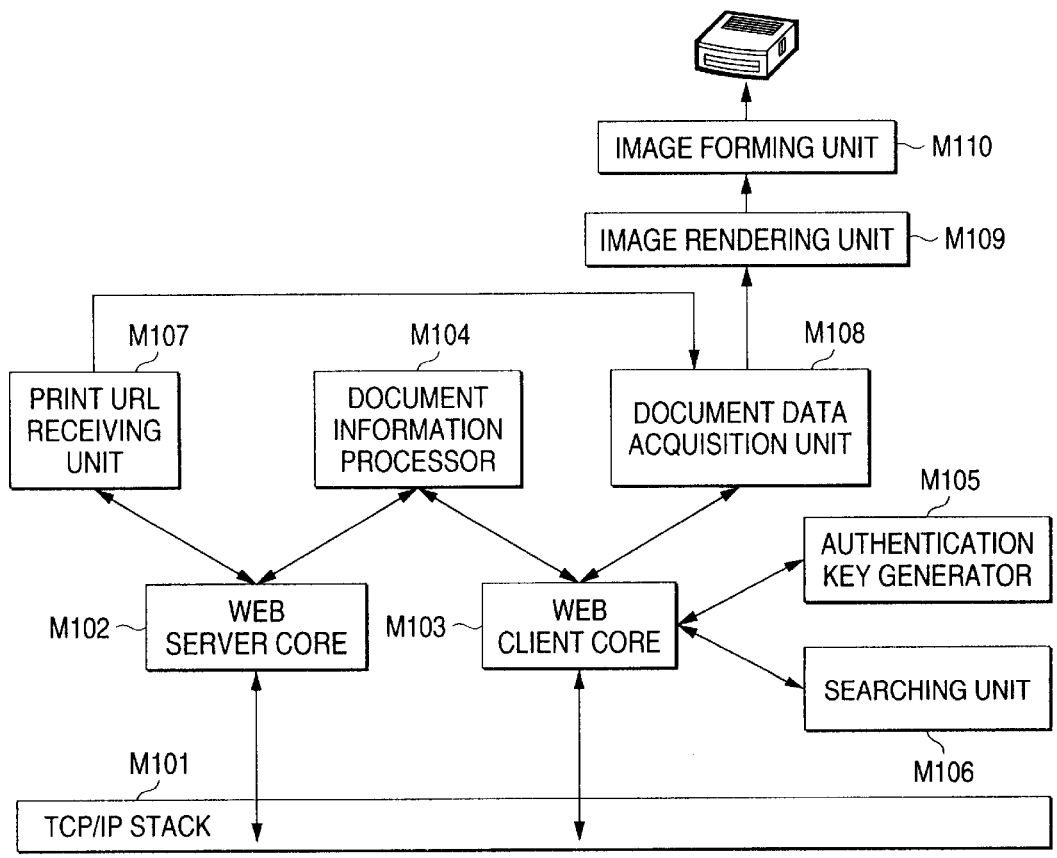
FIG. 6 is a software configuration diagram of the printer of the embodiment.
Figure 7:
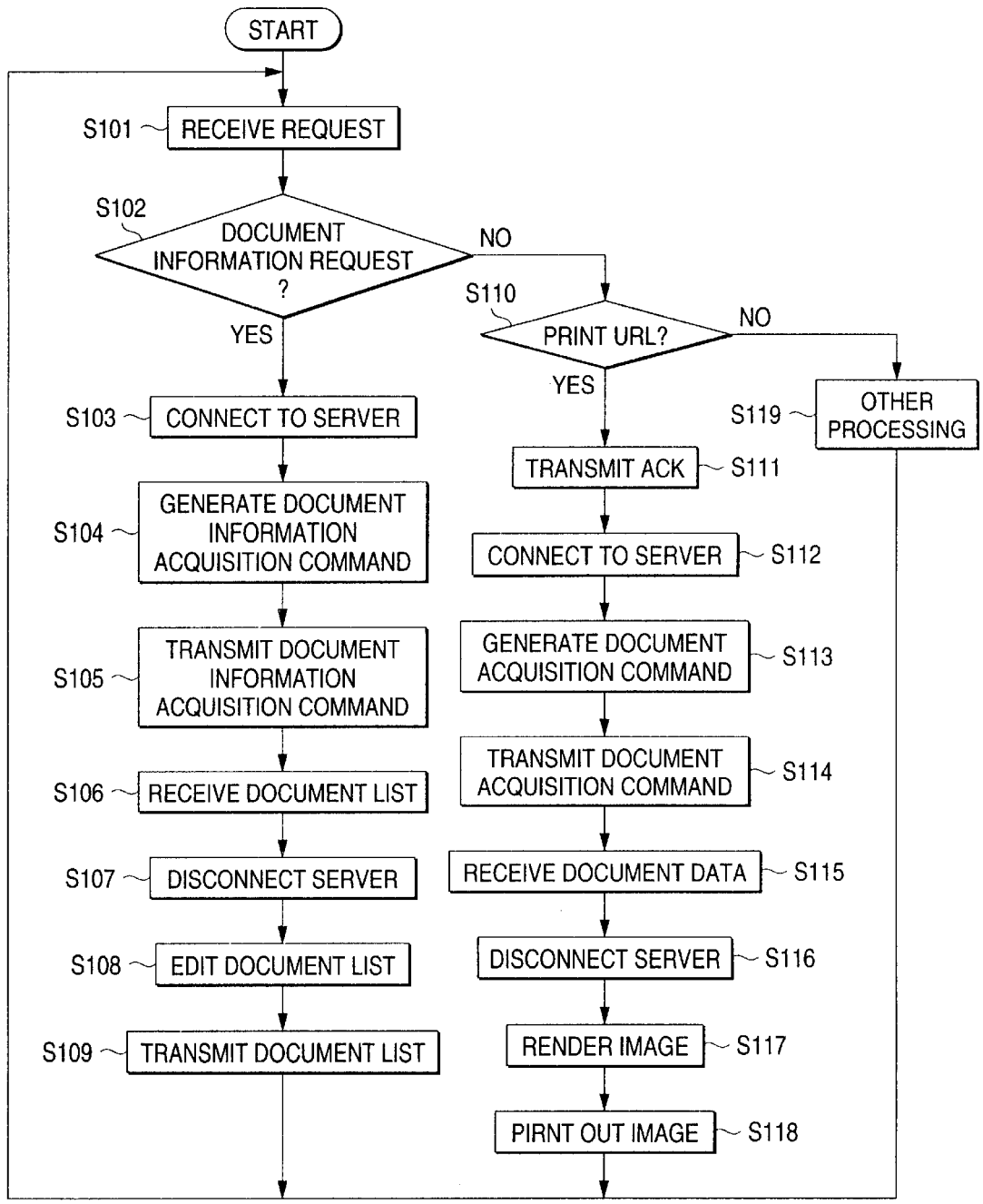
FIG. 7 is an operational flowchart of the printer of the embodiment.
Figures 8, 9:
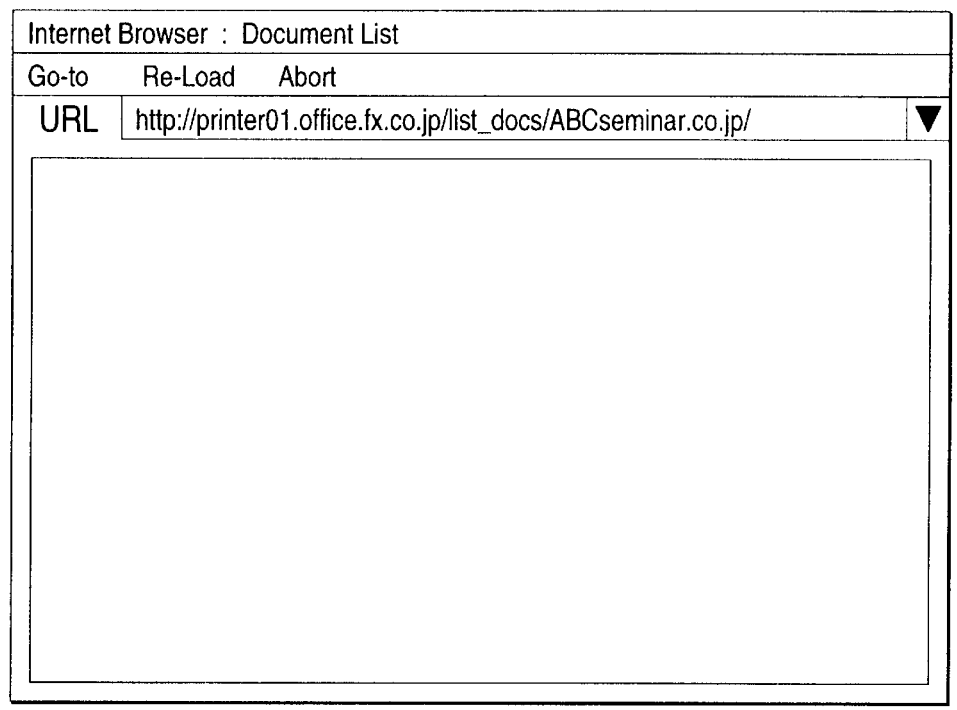
FIG. 8 shows an example of an on-screen display on the computer used when transmitting a document information transmission request to the printer of the embodiment.
FIG. 9 shows an example of an electronic message received by the printer of the embodiment.

FIG. 5 is a sequence diagram showing flows of electronic messages (or electronic information) exchanged in the system configuration of the present embodiment, FIG. 6 is a software configuration diagram of the printer E101 of the embodiment, and FIG. 7 is an operational flowchart of the printer E101 of the embodiment. Now, the operation of the printer E101 is described referring mainly to these Figures. First, an operator enters a URL via a World Wide Web browser running on the computer E102 to request the printer E101 of this embodiment to send document information, so that a document information transmission request T101 is transmitted to the printer E101. This is done as the operator enters a command in a URL field of the Web browser on the computer E102 as illustrated in an example of FIG. 8. Consequently, according to the command entered, the computer E102 sends the document information transmission request in the form of an electronic message conforming to the HyperText Transfer Protocol (HTTP) to the printer E101 as shown in FIG. 9. "list_docs" included in the electronic message indicates that it is a document information transmission request. The description "list_docs" is followed by a character string specifying a server from which the document information is requested. In the example of FIG. 9, "ABCseminar.co.jp" indicates the server from which the document information is requested. Although the document information transmission request T101 itself is transmitted to the printer E101 in this embodiment, the document information transmission request T101 includes source specifying information indicating from which site on a network (e.g., the Internet) the user wishes to receive information on a set of documents. In other words, the user produces a document information transmission request including the source specifying information indicating a site where a desired document is likely to be available and transmits this request to the predetermined printer E101 which has the access rights to the site. Although the source specifying information is simply a server name in the aforementioned example, the user may specify to a more detailed level if he or she knows more precise location of the desired document.

When a Web server core M102 of the printer E101 of this embodiment receives some request in the form of an electronic message (step S101), the Web server core M102 checks contents of the electronic message (steps S102, S110). If it is a document information transmission request (Yes in step S102), a document information processor M104 is activated. The document information processor M104 connects itself to the server E103 via a Web client core M103 (step S103).

Figures 10, 11:
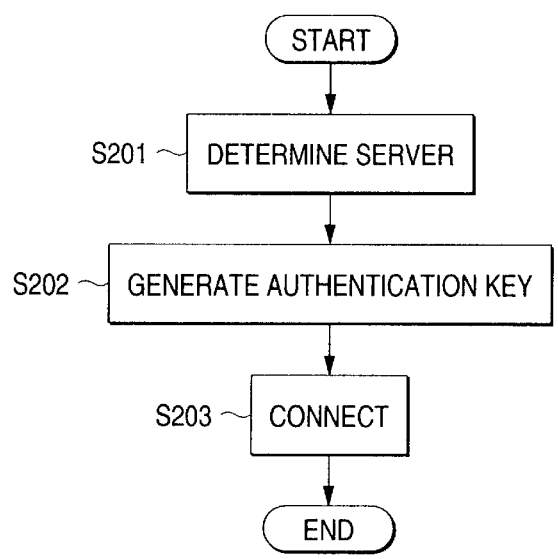
FIG. 10 is an operational flowchart showing how the printer of the embodiment is connected to the server.
FIG. 11 shows an example of an electronic message indicating the document information transmission request the printer of the embodiment transmits.

FIG. 10 is a more detailed operational flowchart showing how the Web client core M103 connects the printer E101 to the server E103. First, the Web client core M103 causes a server searching unit M106 to determine the server E103 from which the document information is requested based on the server name included in the document information transmission request (FIG. 9) using Domain Name Service (DNS) (step S201). In this example, the character string "ABCseminar.co.jp" in the URL shown in FIGS. 8 and 9 indicates the server name. Next, an authentication key generator M105 generates an authentication key of the relevant printer E101 (step S202). Then, the Web client core M103 connects the printer E101 to the server E103 using the authentication key according to a Secure Socket Layer (SSL) procedure (step S203). Electronic messages exchanged between the printer E101 and the server E103 are encrypted by SSL from this point in time until the printer E101 is disconnected from the server E103.

Figure 14:
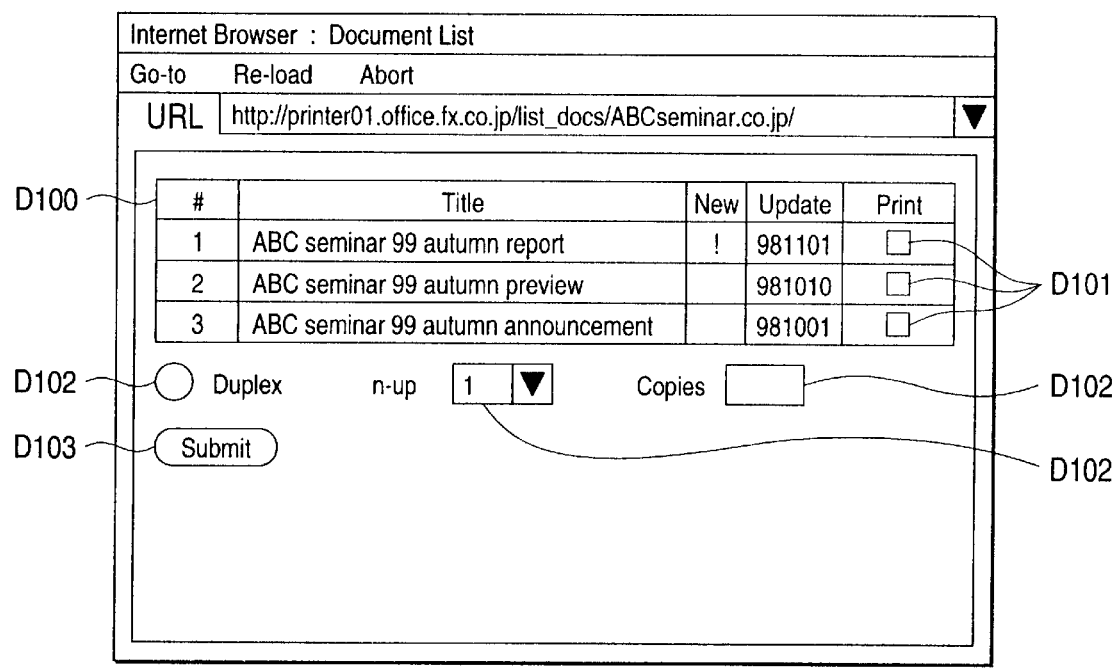
FIG. 14 is a chart showing an example of an on-screen image of the document information transmitted from the printer of the embodiment as it is displayed on the computer.

Subsequently, the document information processor M104 generates a document information acquisition command to be transmitted to the server E103 based on the document information transmission request received (step S104) and transmits the document information acquisition command via the Web client core M103 (step S105). Here, the document information acquisition command transmitted corresponds to a document information transmission request T102 shown in the sequence diagram of FIG. 5. FIG. 11 shows an example of an electronic message indicating the document information transmission request T102. Next, the document information processor M104 of the printer E101 of this embodiment receives document information T103 which is a response to the document information transmission request T102 from the server E103 via the Web client core M103 (step S106), and disconnects the printer E101 from the server E103 (stepS107). In this example, the document information T103 is a list of information, such as URLs, concerning the documents retained in the server E103. More generally, the document information T103 is a list of information on documents available at the "site on the network" specified in the document information transmission request T101. FIG. 12 shows an example of an electronic message indicating the document information T103. As can be seen from FIG. 12, the document information indicating the titles and URLs of the individual documents is written in content parts of a HTTP text in HyperText Markup Language (HTML). Such document information T103 is sent from the server E103 to the printer E101. The document information processor M104 then edits the received document information T103 (step S108) and transmits edited document information T104 to the computer E102 (step S109). FIG. 13 shows an example of an electronic message indicating the document information T104 transmitted from the printer E101 to the computer E102. As shown in FIG. 13, this message indicates the document information in HTML in HTTP data parts. The document information processor M104 attaches Common Gateway Interface (CGI) tags, such as <FORM> and <INPUT>, to the document information T103 shown in FIG. 12 when editing it in step S108. FIG. 14 shows an example of an on-screen image of the document information T104 transmitted from the printer E101 as it is displayed by the Web browser on the computer E102. This means that the printer E101 adds a description for user-interface for enabling the user to select the document to be printed to the document list information T103 received from the server E103, and transmits the document information T104 thus edited to the computer E102.

Upon receiving the document information T104, the computer E102 presents a document select display as shown in FIG. 14, on which the user selects a check box D101 corresponding to the desired document listed in a table D100 listing the available documents. In addition to this, the user can choose or enter additional information concerning document printout operation in entry fields D102, such as a "Duplex" field for selecting double-sided printing and a "Copies" field for specifying the number of printouts. When the user hits a Submit (transmit request) button D103 by using a mouse, for example, the computer E102 generates a print URL message T105 requesting printout of the document currently selected on the Web browser and transmits it to the printer E101. FIG. 15 shows an example of the print URL message T105. In the example of FIG. 15, "print_URL" included in an HTTP command indicates that this electronic message is a print URL request. The URL of the selected document is indicated in HTTP data in Multipurpose Internet Mail Extensions (MIME) format. When the Web server core M102 of the printer E101 of this embodiment receives some kind of request in the form of an electronic message (step S101), the Web server core M102 checks contents of the electronic message (steps S102, S110). If the received electronic message is a print URL request (No in step S102 and Yes in step S110), a print URL receiving unit M107 is activated. The print URL receiving unit M107 activates a document data acquisition unit M108 and sends back an acknowledgment (ACK) message T106 to the computer E102 to report that the print URL message T105 has been correctly received (step Sill). Next, the document data acquisition unit M108 connects itself to the server E103 specified in the print URL request T105 via the Web client core M103 (step S112). The document data acquisition unit M108 uses the same procedure as shown in FIG. 10 in connecting itself to the server E103. Then, the document data acquisition unit M108 of the printer E101 of this embodiment generates a document acquisition command (step S113) and transmits it to the server E103 via the Web client core M103 (step S114). Here, the document acquisition command transmitted in step S114 corresponds to document acquisition request T107 in the sequence diagram of FIG. 5. FIG. 16 shows an example of an electronic message indicating the document acquisition request T107. In the example of FIG. 16, "99a_rep.prn" included in an HTTP command indicates the filename of a document file to be acquired. In summary, the document acquisition request T107 is request data for requesting the document specified in the print URL request T105 from the server E103 specified in the print URL request T105 which has been received from the computer E102.

The server E103 which has received this request T107 acquires data on the document specified in the request from its own file system, for instance, and transmits the document data (T108) to the printer E101 from which the request was received according to the HTTP protocol.

Then, the document data acquisition unit M108 receives the document data (T108) in response to the preceding document acquisition request T107 via the Web client core M103 (step S115). FIG. 17 shows an example of an electronic message indicating the document data (T108). The document data is included in a content part of a HTTP text in Page Description Language (PDL) format. The document data acquisition unit M108 then causes the Web client core M103 to disconnect the printer E101 from the server E103 (step S116). The document data (T108) received by the document data acquisition unit M108 is transferred to an image rendering unit M109, which converts the data into bit-mapped graphics format (step S117). A bit-mapped image thus created is output to the print engine P107 via an image forming unit M110 and the print engine P107 prints the image on a specified sheet of paper, for instance (step S118).

As shown in the foregoing discussion, it is possible to obtain a printout of a document whose precise URL is not known by just accessing the predesignated printer E101 according to the present embodiment.

Furthermore, it is possible to provide the user with the reference information of the desired document while prohibiting the user from searching the inside of the server E103 by using the computer E102. This is because the user should request the reference information of the documents available in the desired server E103 via the predesignated printer E101 (whose authenticity can be properly verified by the server E103), and not directly from the server E103, in this embodiment.

Although the foregoing discussion has dealt with a method of determining the server from which the desired document can be acquired by DNS, it is possible to use other name service than DNS, or a directory research service such as Lightweight Directory Access Protocol (LDAP). Although the above-described embodiment includes step S201 for specifying a server, the server may be unchangeably predetermined.

Although the source specifying information concerning the server E103 from which the document is requested, for instance, is included in the document information transmission request T101 to be sent from the computer E102 to the printer E101 in the foregoing embodiment, this is not necessarily essential. For example, the embodiment may be modified such that the nonvolatile RAM P104 of the printer E101 stores a predefined address (e.g., server name) and, when a document information transmission request T101 has been received from the computer E102, the printer E101 automatically sends a document information transmission request T102 to the address stored in the nonvolatile RAM P104. In this alternative arrangement, it is not always necessary to specify a server to be accessed when generating the document information transmission request on the computer E102. The printer E101 may select the address stored in the nonvolatile RAM P104 as a default and transfer the document information transmission request to the address specified in the nonvolatile RAM P104 when no other address is explicitly designated in the document information transmission request received from the computer E102.

In this case, information on the address to be stored in the nonvolatile RAM P104 may be preset by using the operation panel P105 of the printer E101 or by sending the address (e.g., URL) of the server by electronic mail, for instance, from the server to the printer E101. This alternative arrangement may be such that information on the address (e.g., server name) can be set individually for each computer (or for each user). The nonvolatile RAM P104 stores the information which designates the server to which the document information transmission request received by the printer E101 should be transferred as discussed above. The server to be accessed is determined based on the information stored in the nonvolatile RAM P104.

Furthermore, although the printer E101 determines the server E103 from which the document is requested in the foregoing embodiment, this arrangement may be modified such that the printer E101 is connected to a predetermined proxy server, whereby the printer E101 transmits a predetermined HTTP message to the proxy server, and the proxy server finds the relevant server based on the HTTP message.

Although the printer E101 is authenticated by SSL in the foregoing embodiment, authentication may be made by a method other than SSL. Also, when the user utilizes a server providing documents which do not require security or copyright protection, it is not necessary to authenticate the printer E101.

Although the printer E101 of the foregoing embodiment transmits the document information transmission request T102 after performing a predetermined conversion from the document information transmission request T101 received from the computer E102, the embodiment may be modified such that the printer E101 can transfer the document information transmission request without performing such conversion. Furthermore, although the foregoing discussion has illustrated an example in which the printer E101 transmits the document information T104 after editing the document list information T103 received from the server E103, the embodiment may be modified such that the printer E101 simply transfers the received data without editing. Moreover, although the foregoing discussion has recited an example which utilizes HTTP and HTML, it is possible to use other communications protocol or data description format. For example, the embodiment may be modified such that a document database is built in the server E103 and document information is sent and received by using a database manipulation language like Structured Query Language (SQL).

What is claimed is:

1. A printing device which receives reference information of a desired document from an external device, acquires the document from a server using the reference information and performs a predetermined operation, the printing device comprising:

receiving means for receiving a reference information request asking for reference information of documents available in the server from the external device;

reference information acquisition means for acquiring the reference information from the server according to the reference information request received by the receiving means; and reference information transmission means for transmitting the reference information acquired by the reference information acquisition means to the external device which has issued the reference information request.

2. The printing device according to claim 1, further comprising:

server designation means for determining the server from which the reference information is to be acquired based on the reference information request received by the receiving means;

wherein the reference information acquisition means acquires the reference information according to the reference information request from the server determined by the server designation means.

3. The printing device according to claim 2, further comprising:

server designation information input means which allows entry of information to be used for determining the server based on the reference information request; and a server designation information memory for storing the information entered from the server designation information input means;

wherein the server designation means determines the server from which the reference information is to be acquired based on the information stored in the server designation information memory.

4. The printing device according to claim 1, further comprising:

a request converter for converting the reference information request received by the receive means into a predetermined format which can be recognized by the server;

wherein the reference information acquisition means acquires the reference information from the server by sending the reference information request converted by the request converter to the server.

5. The printing device according to claim 1, further comprising:

a reference information converter for converting the reference information acquired by the reference information acquisition means into a predetermined format which can be displayed by the external device;

wherein the reference information transmission means transmits information converted from the reference information by the reference information converter.

6. The printing device according to claim 5, wherein the reference information converter converts the reference information acquired by the reference information acquisition means into the information of such format that makes it possible to accept an input by an operator specifying a desired item in the reference information at the external device and to be transferred to the printing device.

7. The printing device according to claim 5, wherein the reference information converter converts the reference information acquired by the reference information acquisition means into such format that enables an operator to enter additional information concerning a printing method for the desired document at the external device.

8. The printing device according to claim 1, further comprising authentication means which enables a predetermined authentication operation between the server and the printing device.

9. A printing system in which reference information indicating the location of a document requested by an operator is sent from a computer manipulated by the operator to a printer, and the printer which has received the reference information acquires the document corresponding to the reference information from a server according to the reference information;

wherein the printer comprises reference information acquisition means for acquiring a list of reference information of documents available in the server in response to a request from the computer, and reference information transmission means for transmitting the acquired list of the reference information to the computer; and wherein the server sends back the list of the reference information of the documents to the printer in response to a request from the printer.

10. The printing system according to claim 9, wherein the printer further comprises means for determining the server from which the list of the reference information is to be acquired based on information included in the request from the computer, and wherein the reference information acquisition means acquires the list of the reference information from the server designated by the means for determining the server.

11. The printing system according to claim 9, wherein the server further comprises means for determining whether the request for the list of the reference information was issued by a previously registered printer when the request has been received, and wherein the server accepts the request only from the previously registered printer.

12. A method of printing a desired document available in a server by using a printer selected by a user according to a command from a computer which is manipulated by the user, the method comprising the steps of:

(a) causing the computer to send a list acquisition request to the user-selected printer requesting it to acquire a list of reference information of documents available in the server;

(b) causing the printer to send a list transmission request to the server requesting it to send back the list of the reference information of the documents in accordance with the list acquisition request;

(c) causing the server to send back the list of the reference information of the documents available in the server to the printer in accordance with the list transmission request;

(d) causing the printer to send data on the list of the reference information received from the server to the computer;

(e) causing the computer to present a selection entry display based on the data on the list of the reference information received from the printer, enabling the user to specify the desired document;

(f) causing the computer to send a print request to the printer, the print request including the reference information of the document specified by the user on the selection entry display; and (g) causing the printer to acquire data on the user-specified document from the server based on the reference information included in the print request and print out the document.

13. The method of claim 12 further comprising the step of causing the server to verify the authenticity of the printer from which list transmission request has been received between steps (b) and (c), wherein the server is allowed to proceed to step (c) only when the authenticity of the printer has been established.

14. The printing device according to claim 1, wherein the server is an external server, which is external to the printing device.

* * * * *